United States Patent
Arnott et al.

(10) Patent No.: US 9,707,817 B1
(45) Date of Patent: Jul. 18, 2017

(54) SHOCK APPARATUS, METHOD AND SYSTEM FOR ALL VEHICLES

(71) Applicant: Arnott T&P Holding, LLC, Merritt Island, FL (US)

(72) Inventors: Adam M. Arnott, Windermere, FL (US); Matt Edward Kirar, Merritt Island, FL (US)

(73) Assignee: Arnott T&P Holding, LLC, Merritt Island, FL (US)

( * ) Notice: Subject to any disclaimer, the term of this patent is extended or adjusted under 35 U.S.C. 154(b) by 0 days.

(21) Appl. No.: 15/136,001

(22) Filed: Apr. 22, 2016

Related U.S. Application Data

(63) Continuation-in-part of application No. 15/007,785, filed on Jan. 27, 2016, which is a continuation-in-part of application No. 14/988,342, filed on Jan. 5, 2016, which is a continuation-in-part of application No. 14/966,678, filed on Dec. 11, 2015.

(51) Int. Cl.
| | |
|---|---|
| *B60G 15/12* | (2006.01) |
| *B62K 25/28* | (2006.01) |
| *B60G 17/052* | (2006.01) |
| *B62K 25/04* | (2006.01) |

(52) U.S. Cl.
CPC ......... *B60G 15/12* (2013.01); *B60G 17/0521* (2013.01); *B62K 25/283* (2013.01); *B60G 2202/314* (2013.01); *B60G 2300/12* (2013.01); *B60G 2500/201* (2013.01); *B60G 2500/30* (2013.01); *B62K 2025/045* (2013.01)

(58) Field of Classification Search
CPC ............... B60G 15/12; B60G 17/0521; B60G 2500/201; B60G 2300/12; B60G 2202/314; B60G 2500/30; B62K 25/283; B62K 2025/045
See application file for complete search history.

(56) References Cited

U.S. PATENT DOCUMENTS

| | | |
|---|---|---|
| 2,324,058 A | 7/1943 | Boor |
| 2,571,279 A | 10/1951 | Myklestad |
| 2,856,035 A | 10/1958 | Rohacs |
| 3,024,875 A | 3/1962 | Stultz |
| 4,560,042 A | 12/1985 | Sell |
| 4,566,565 A | 1/1986 | Wicke |

(Continued)

*Primary Examiner* — Drew J Brown
(74) *Attorney, Agent, or Firm* — Brian S. Steinberger; Law Offices of Brian S. Steinberger, P.A.

(57) ABSTRACT

Adjustable air suspension shocks with rotatable damper assemblies, apparatus, systems and method for motor vehicles, such as automobiles, vans, trucks, off the road vehicles, motorcycles, the like. Deflating interior air springs/airbags (bladders) allows for pistons on shock absorbers to expand outward separating lower front and rear frame portions which effectively lowers the motor vehicle to the ground surface and for the driver to have a firmer ride. Inflating the airbags (bladders) allows for the pistons on the shock absorbers in the devices to retract so that devices have a more shock absorbing effect giving the driver and passenger(s) a smoother ride, which also raises the motor vehicles above the ground surface. A sleeve attached to the air shock allows for a damper assembly to rotate relative to the air shock so that it can be installed within mounting brackets where the axial mounting openings need not be perpendicular to one another.

20 Claims, 14 Drawing Sheets

(56) References Cited

U.S. PATENT DOCUMENTS

| | | | |
|---|---|---|---|
| 4,664,234 A | 5/1987 | Wight | |
| 5,172,794 A | 12/1992 | Ward | |
| 5,458,219 A | 10/1995 | Anderson | |
| 5,833,036 A | 11/1998 | Gillespie | |
| 6,193,005 B1 | 2/2001 | Jurrens | |
| 6,244,398 B1 | 6/2001 | Girvin | |
| 6,357,546 B1 | 3/2002 | Crosby | |
| 6,374,966 B1 | 4/2002 | Lillbacka | |
| 6,648,309 B2 | 11/2003 | Beck | |
| 7,546,894 B1 | 6/2009 | Glenn | |
| 7,559,396 B2 | 7/2009 | Schwindt | |
| 7,798,295 B2 | 9/2010 | Jurrens | |
| 7,954,792 B2 * | 6/2011 | Adonakis | B60G 3/20 267/221 |
| 8,113,322 B2 | 2/2012 | Arnott | |
| 8,292,306 B1 | 10/2012 | Arnott | |
| 2004/0245746 A1 | 12/2004 | Chamberlain | |
| 2010/0117320 A1 * | 5/2010 | Grozev | B60G 11/58 280/124.16 |
| 2010/0200343 A1 * | 8/2010 | Kondo | B60G 13/02 188/267 |
| 2014/0239602 A1 * | 8/2014 | Blankenship | B60G 17/0152 280/5.515 |
| 2016/0075204 A1 * | 3/2016 | Marking | F16F 9/062 267/225 |

\* cited by examiner

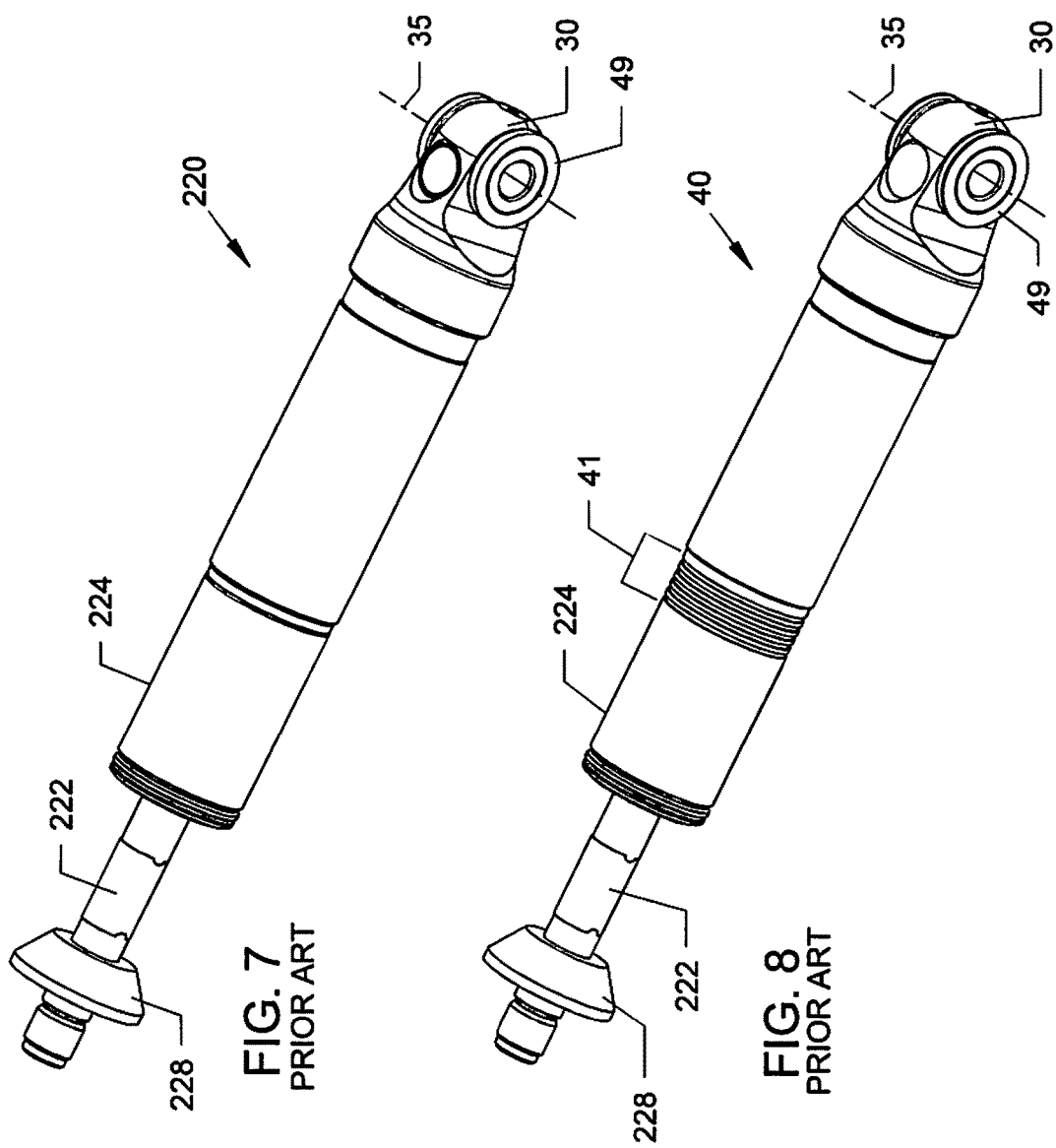

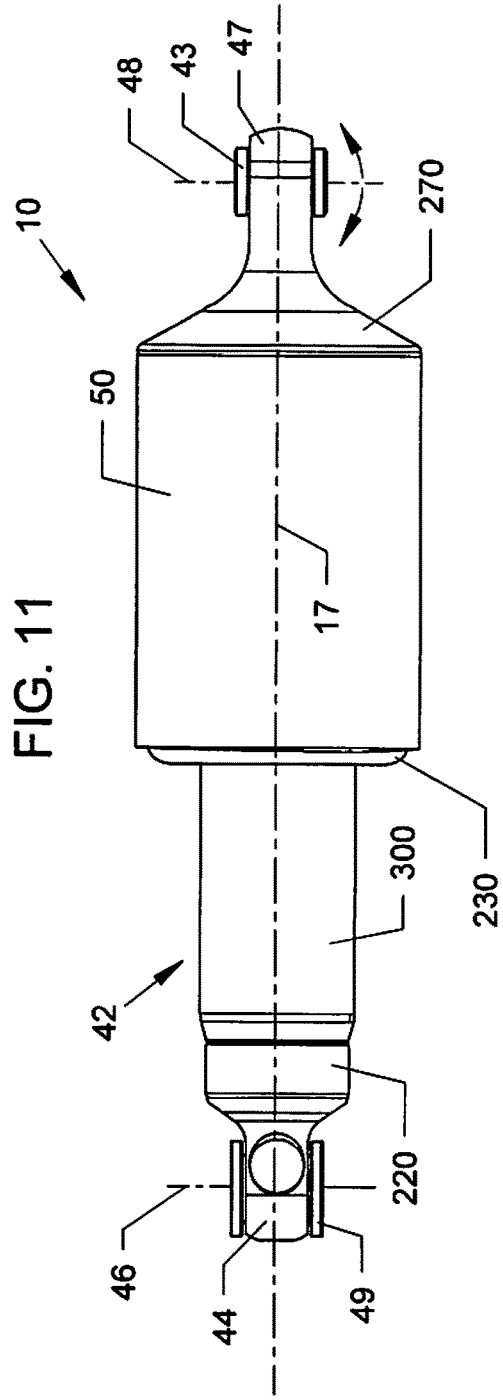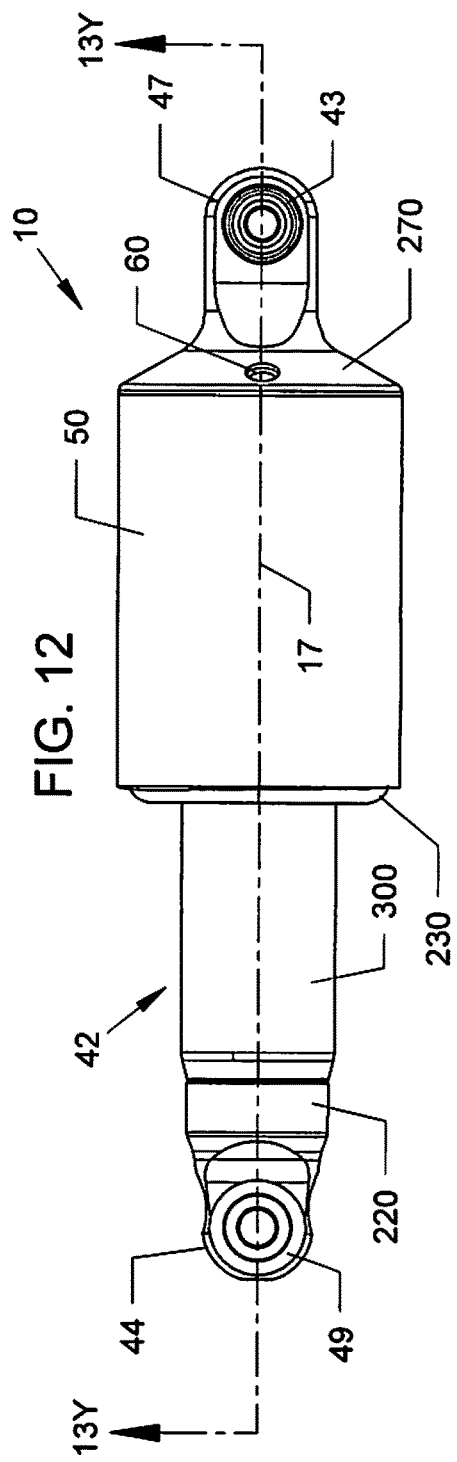

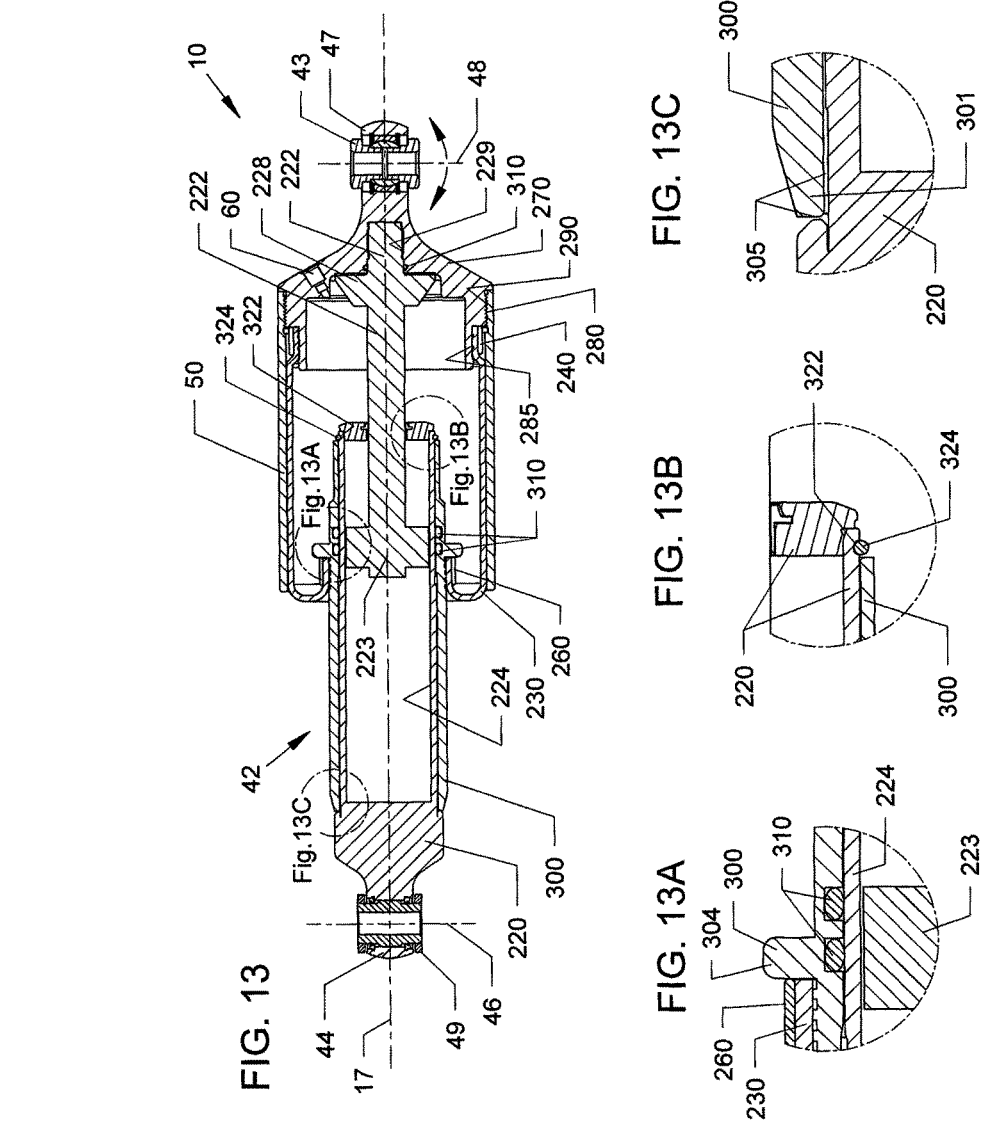

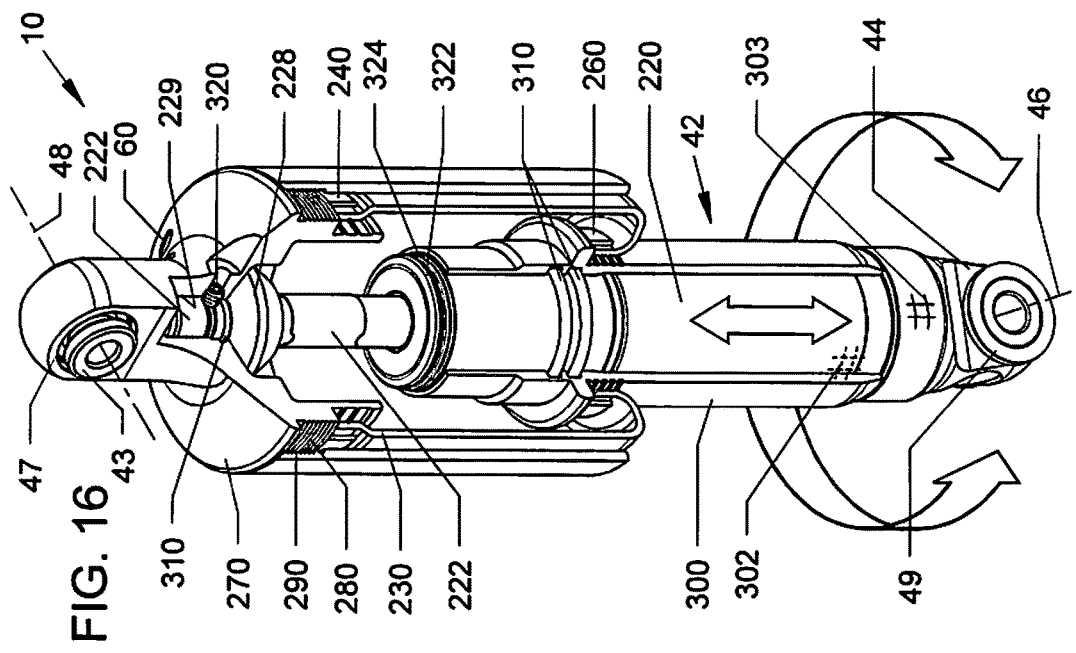
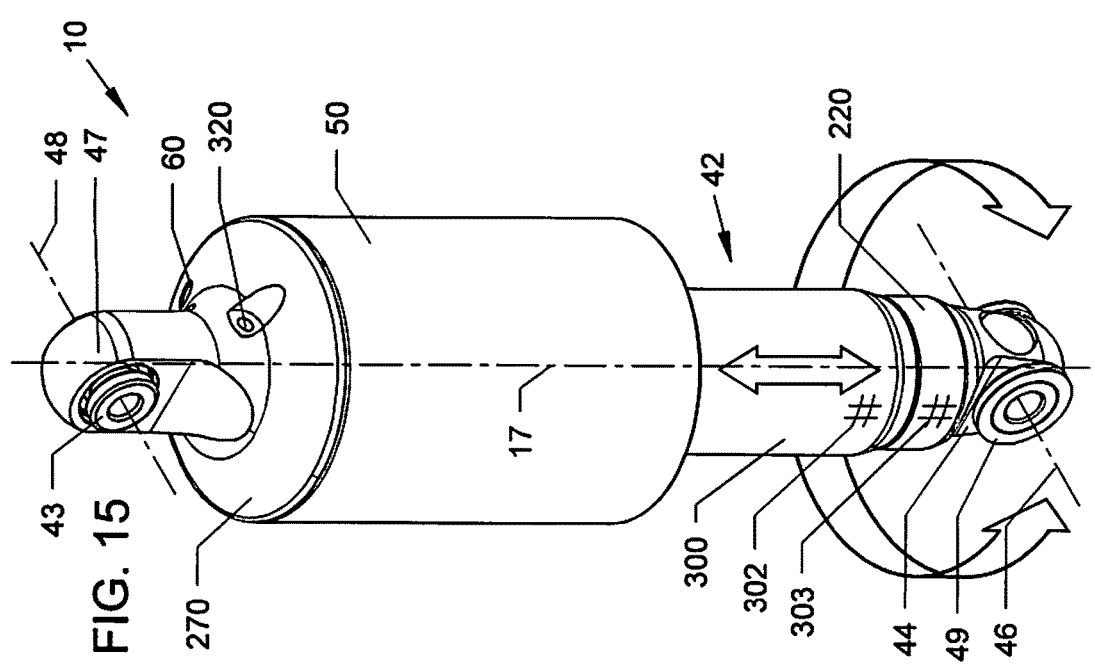

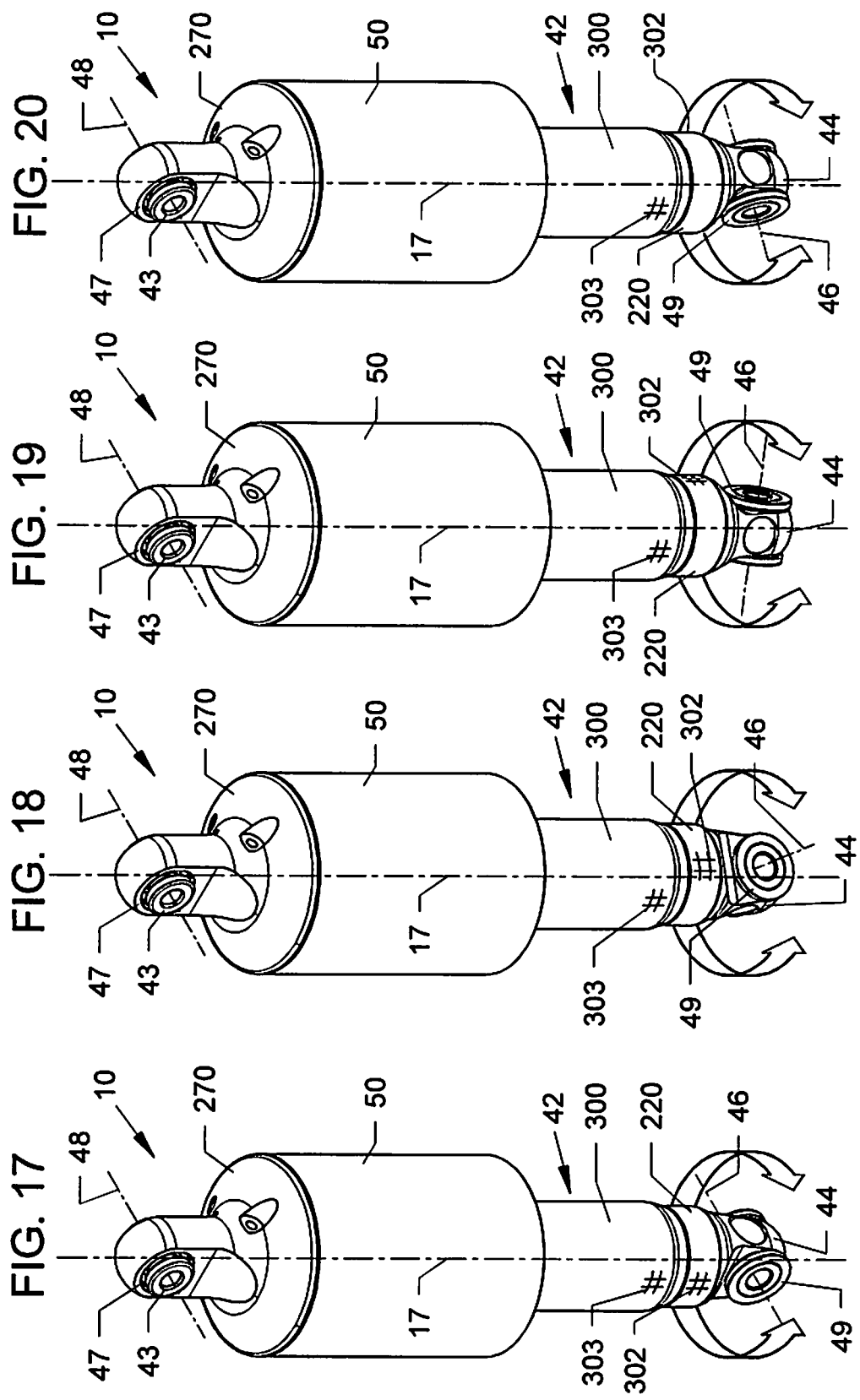

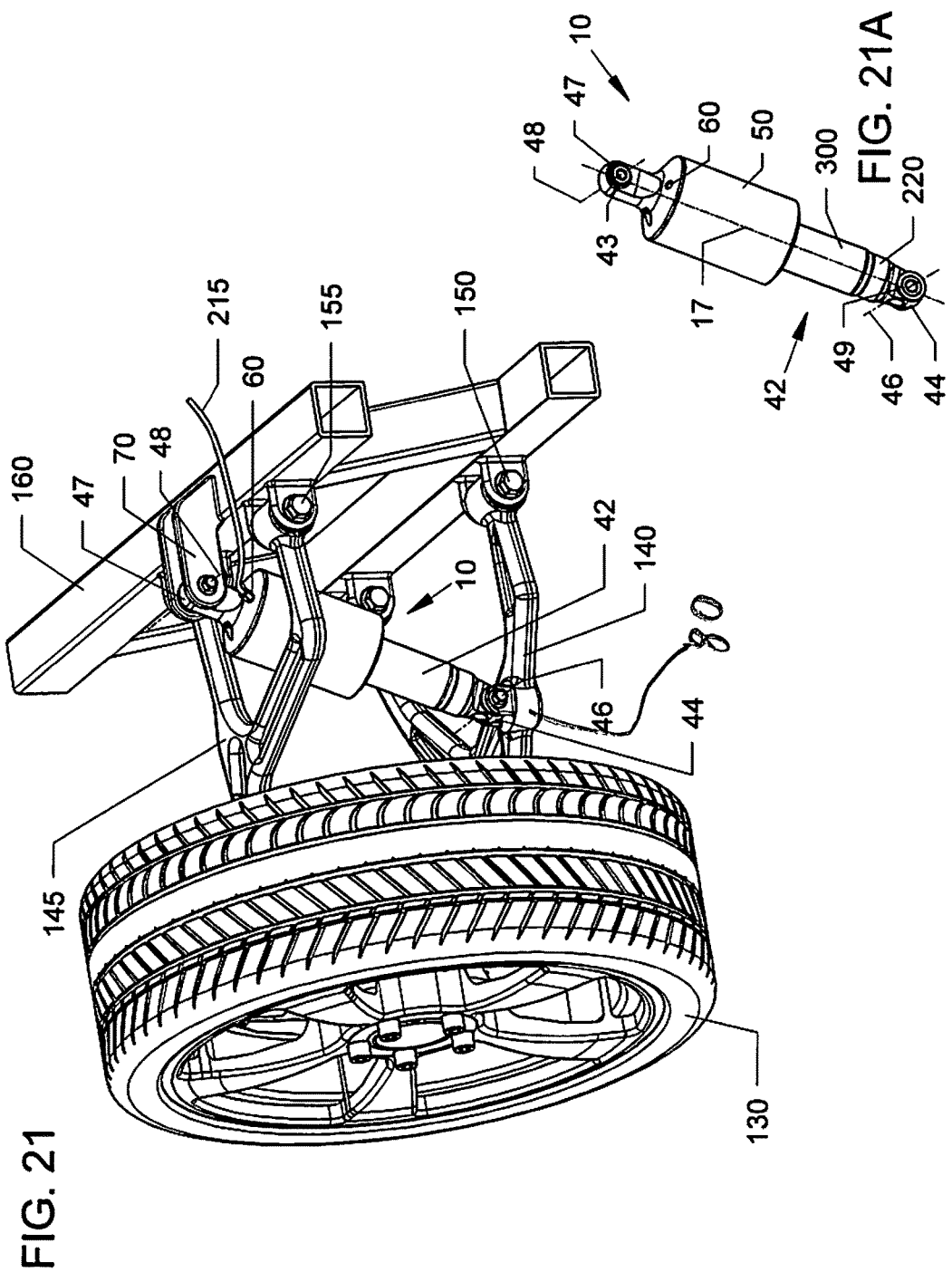

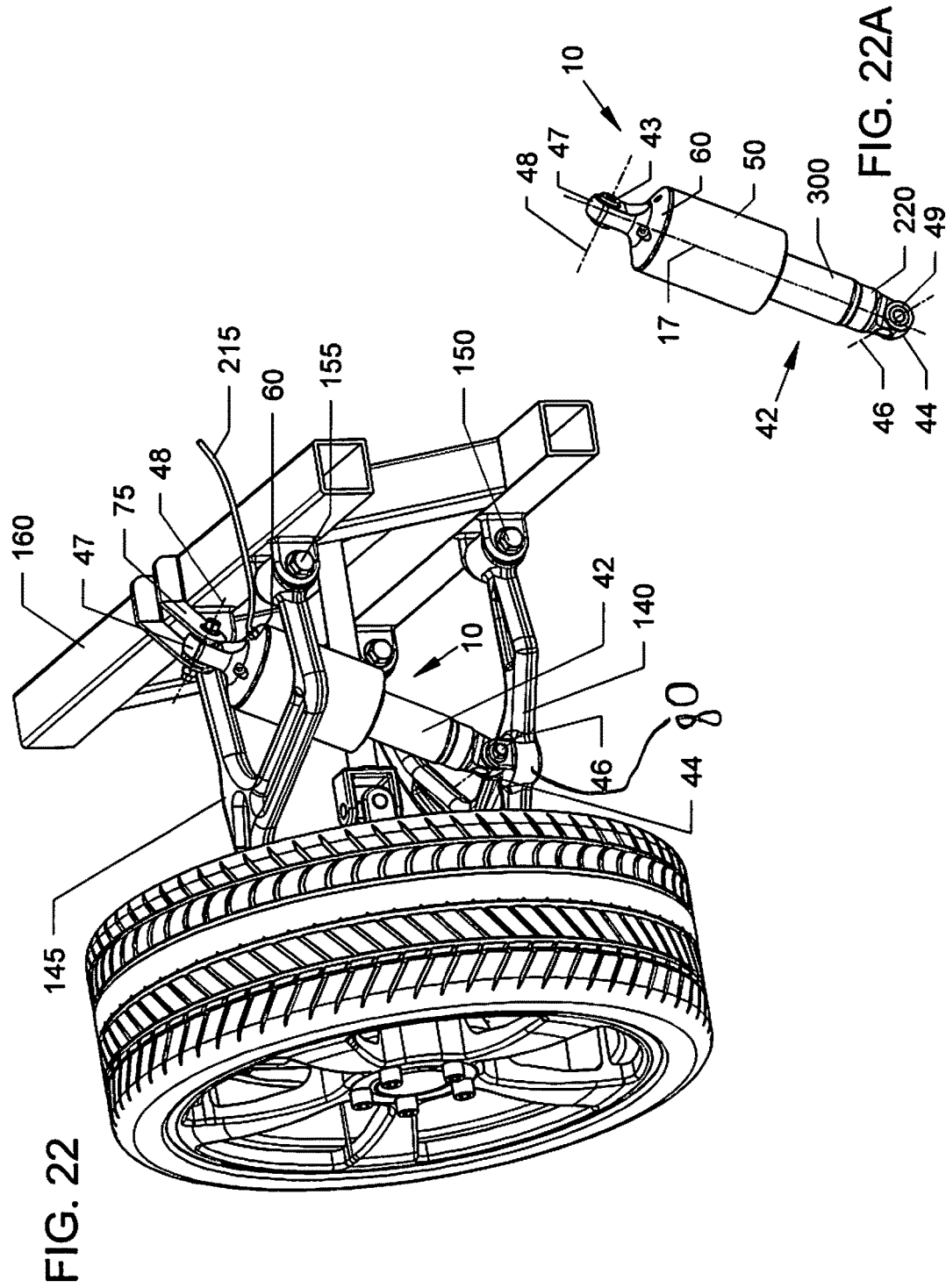

SHOCK APPARATUS, METHOD AND SYSTEM FOR ALL VEHICLES

CROSS REFERENCE TO RELATED APPLICATION

This application is a Continuation In Part of U.S. patent application Ser. No. 15/007,785 filed Jan. 27, 2016, which is a Continuation In Part of U.S. patent application Ser. No. 14/988,342 filed Jan. 5, 2016, which is a Continuation In Part of U.S. patent application Ser. No. 14/966,678 filed Dec. 11, 2015. The entire disclosure of each of the applications listed in this paragraph are incorporated herein by specific reference thereto.

FIELD OF INVENTION

This invention relates to air shocks and dampers, in particular to adjustable air suspension shocks with built-in rotatable damper device, apparatus, system and method for all vehicles.

BACKGROUND AND PRIOR ART

Conventional, stock, and after-market suspension products such as air shocks and air springs are generally preset to a specific maximum weight accommodation level. This preset suspension does not always provide the best ride or handling for the riders. Additionally, some types of motor vehicles are known to have harsh rides that are not comfortable for many riders such as the elderly, overweight individuals, and women.

Conventional air suspension systems often result in non-smooth and uncomfortable rides, coupled with undesirable vehicle ride performance.

Various types of air suspension systems have been proposed over the years. U.S. Pat. No. 6,648,309 to Beck describes a piston rod with low/high pressure chambers. U.S. Pat. No. 6,374,966 to Lillbacka describes a piston rod that moves within the chamber and is surrounded by an outer chamber with sealing gaskets. An o-ring seals isolate compartment from environment outside of shock absorber; compressible fluid in inner chamber; coil spring provided about piston rod; air inlet, a fluid, i.e. air, pumped into elastomeric tube so that the inflated elastomeric tube acts as air spring to enhance shock absorbing ability of shock absorber.

U.S. Pat. No. 6,244,398 to Girvin describes a shock absorber with a shaft that extends into a reservoir housing which includes a hydraulic reservoir and gas chamber. The chamber seal includes an o-ring to separate the gas chamber from the hydraulic reservoir. There are springs on the shaft, a piston, and shim washers at the end of the piston, a reservoir cap, reservoir seal, and a bumper.

U.S. Pat. No. 5,833,036 to Gillespie describes an airbag in a reservoir of a cylinder, a piston assembly disposed within an inner cylinder and mounted to a piston rod. The piston rod comprising of piston assembly piston, check valve, a seal ring, seal ring carrier, bypass spring, spring abutment plate, and an end outer cylinder sealed plate with threaded mounting member.

U.S. Pat. No. 5,458,219 to Anderson describes a piston; reservoir containing gas cells. U.S. Pat. No. 5,172,794 to Ward describes a gas bag; piston assembly disposed within inner cylinder; piston rod that moves within piston assembly and extends into rebound chamber; outer cylinder with end cap; seal ring; ring; spring; and an end cap.

U.S. Pat. No. 4,664,234 to Wight; U.S. Pat. No. 4,566,565 to Wicke et al.; and U.S. Pat. No. 4,560,042 to Sell et al.; each describe self pressurized dampers. U.S. Pat. No. 3,024,875 to Stultz describes a shock absorber. U.S. Pat. No. 2,571,279 to Nils O. Mykestad describes a cylinder that defines a fluid reservoir containing a sack where air is introduced to a piston rod with sealing means and springs bear against it. And U.S. Pat. No. 2,324,058 to A. Boor et al. describes a hydraulic shock absorber structure.

U.S. Pat. No. 8,113,322 to Arnott, which has the same assignee as the subject invention, which is incorporated by reference in its' entirety, describes a motorcycle air suspension system and method that requires the use of two identical air suspension devices 1, FIG. 14 mounted side by side to provide adjustable air suspension control.

Combining both liquid damping with the air shock generally requires extra seals to keep fluid from leaking out of the housing and also contaminating the air suspension components in the same housing. As such, there can be reliability issues by combining both air suspension and the liquid damping effects in the same housing.

The prior art discloses various types of air suspension systems and their respective components. However, none of the cited references overcomes the problems with the prior art described above. More particularly none of the prior art describes an easily adjustable system for use with motor vehicles that allows the rider to have an adjustable ride based on the air suspension cylinders, with a rotatable damper assembly.

Thus, the need exists for solutions to the above problems with the prior art.

SUMMARY OF THE INVENTION

A primary objective of the present invention is to provide adjustable air suspension shocks with built-in rotatable damper device, apparatus, system and method for all types of motor vehicle and motor cycles.

A secondary objective of the present invention is to provide adjustable air suspension shocks with built-in rotatable damper device, apparatus, system and method for all vehicles, which can be mounted in different radial orientation positions in all types of motor vehicles and motor cycles.

A third objective of the present invention is to provide adjustable air suspension shocks with built-in rotatable damper device, apparatus, system and method for all vehicles having more versatility than existing shocks and dampers.

A fourth objective of the present invention is to provide adjustable air suspension shocks with built-in rotatable damper device, apparatus, system and method for all vehicles having a more smoother and comfortable ride with suspension, adjustable suspension height, A fifth objective of the present invention is to provide adjustable air suspension shocks with built-in rotatable damper device, apparatus, system and method for all vehicles having so that an increase of air will stiffen the ride and raise the suspension, while a release of air will soften the ride and lower the suspension.

An sixth objective of the present invention is to provide adjustable air suspension shocks with built-in rotatable damper device, apparatus, system and method for all vehicles to allow the shock absorber(s) to act as an extendable and retractable rod to lower or raise the vehicle.

A seventh objective of the present invention is to provide adjustable air suspension shocks with built-in rotatable damper device, apparatus, system and method for all vehicles where tuning air suspension is done to individual tastes and usually reduced to a few minutes via onboard adjustability.

An eighth objective of the present invention is to provide adjustable air suspension shocks with built-in rotatable damper device, apparatus, system and method for all vehicles where air suspension can be instantly set to specific driving conditions, resulting in improved drive handling.

An ninth objective of the present invention is to provide adjustable air suspension shocks with built-in rotatable damper device, apparatus, system and method for all vehicles where adjustability can be customized between various settings that are smooth and comfortable, firm and rigid, or somewhere in the middle. Motor vehicle rider performance can be based on the driver's desired settings, with existing components on the motorcycle.

A tenth objective of the present invention is to provide adjustable air suspension shocks with built-in rotatable damper device, apparatus, system and method for all vehicles where adjustability can be based on the riders height, weight, desired ride comfort levels, and other customizations.

Unlike factory installed air suspension shocks, the invention allows the user to raise or lower the rear shocks through the full range of the suspension travel. This gives the motor vehicle rider the flexibility of setting the height of the rear suspension based on the rider's weight, height, and preference, helping ensure both safety and comfort through enhanced control and stability.

The invention can be manufactured to be used in motorized or non-motorized vehicles. This invention uses an inflatable air spring or rubber/elastomeric airbag/bladder, a shock absorber, a coil spring along with an hydraulic damper.

The benefits of this invention are a smoother suspension, adjustable suspension height, and adjustable suspension stiffness. A practical application of this invention would be on any motorcycle configuration as well as on other vehicles. The end user of the product can adjust the suspension to accommodate their personal weight as well as any cargo weight. This adjustability of the suspension is what improves the ride characteristics of the motorcycle for each individual user.

Conventional, stock, and after-market suspension are preset to a specific maximum weight accommodation level. This preset suspension does not always provide the best ride or handling. The invention allows the user to adjust the suspension levels of the vehicle according to their preference. By allowing the user to adjust the suspension level, the adjustable invention provides a comfortable ride in the motor vehicle which in turn provides a more enjoyable ride experience. The suspension will absorb the right amount of shock or energy to prevent jerky handling, and adjusting the invention to the appropriate setting will allow the vehicle to handle safer than with a conventional or stock suspension. Air is pumped into and fills the air spring/airbag/bladder, which enables this adjustability; an increase of air will stiffen the ride and raise the suspension, while a release of air will soften the ride and lower the suspension.

The coil spring may or may not be used in some assemblies. Acting as a lift helper, the coil spring is used to decrease the amount of air pressure that would be needed to lift a load. It keeps the vehicle at a somewhat standard level, so that adjusting the lift level is not entirely dependent upon air pressure. In fact, with this invention, a minimal amount of air pressure is needed.

The invention combines a shock absorber with inflatable air spring/airbag/bladder and spring along with O-rings and other components.

Further objects and advantages of this invention will be apparent from the following detailed description of the presently preferred embodiments which are illustrated schematically in the accompanying drawings.

BRIEF DESCRIPTION OF THE FIGURES

FIG. 1A is an enlarged view of the control panel shown in FIG. 1.

FIG. 1B is a perspective view of the adjustable air shock device with rotating damper assembly shown in FIG. 1.

FIG. 2A is an enlarged view of the control panel shown in FIG. 2.

FIG. 2B is a perspective view of the adjustable air shock device with rotating damper assembly shown in FIG. 2.

FIG. 7 is a perspective view of a prior art damper assembly having no radial grooves.

FIG. 8 is another perspective view of the prior art air damper assembly with radial grooves in place for use with an airbag.

FIG. 11 is front side view of the novel adjustable air shock with rotatable damper assembly shown in FIGS. 1B and 2B.

FIG. 12 is a top side view of the adjustable air shock and rotatatable damper assembly of FIG. 11

FIG. 13 is a cross-sectional view of the adjustable air shock and rotatable damper assembly of FIG. 12 along arrows 13Y.

FIG. 13A is an enlarged view of the air bag crimped to the damper sleeve shown in FIG. 13.

FIG. 13B is an enlarged view of the top of the damper assembly with groove in damper assembly to support O-ring.

FIG. 13C is an enlarged view of the bottom of the damper assembly with gap between the sleeve and rotatable assembly which allows rotational movement.

FIG. 15 is a perspective view of the adjustable air shock with rotatable damper assembly of FIGS. 11-14.

FIG. 16 is partial breakaway view of the adjustable air shock and rotatable damper assembly of FIG. 15 with damper assembly rotating relative to the sleeve.

FIG. 17 is another perspective view of the adjustable air shock with rotatable damper assembly of FIG. 15.

FIG. 18 is another perspective view of FIG. 17 with adjustable air shock rotatable damper starting to rotate counter-clockwise.

FIG. 19 is another perspective view of FIG. 17 with adjustable air shock rotatable damper starting to rotated approximately 90 degrees counter-clockwise.

FIG. 20 is another perspective view of FIG. 17 with adjustable air shock rotatable damper starting to rotated approximately 180 degrees counter clockwise.

FIG. 21 is a perspective view of the novel adjustable air shock with rotatable damper assembly installed into a motor vehicle with the orientation of the both shock mount brackets axes are parallel to one another.

FIG. 21A is a perspective view of the air shock assembly with rotatable damper assembly of FIG. 21.

FIG. 22 is a perspective view of another installation of the novel adjustable air shock with rotatable damper assembly where the orientation of the shock mount brackets are approximately 45 degrees out of parallel to one another.

FIG. 22A is a perspective view of the air shock assembly with rotatable damper assembly of FIG. 22.

DESCRIPTION OF THE PREFERRED EMBODIMENTS

Figure 1:
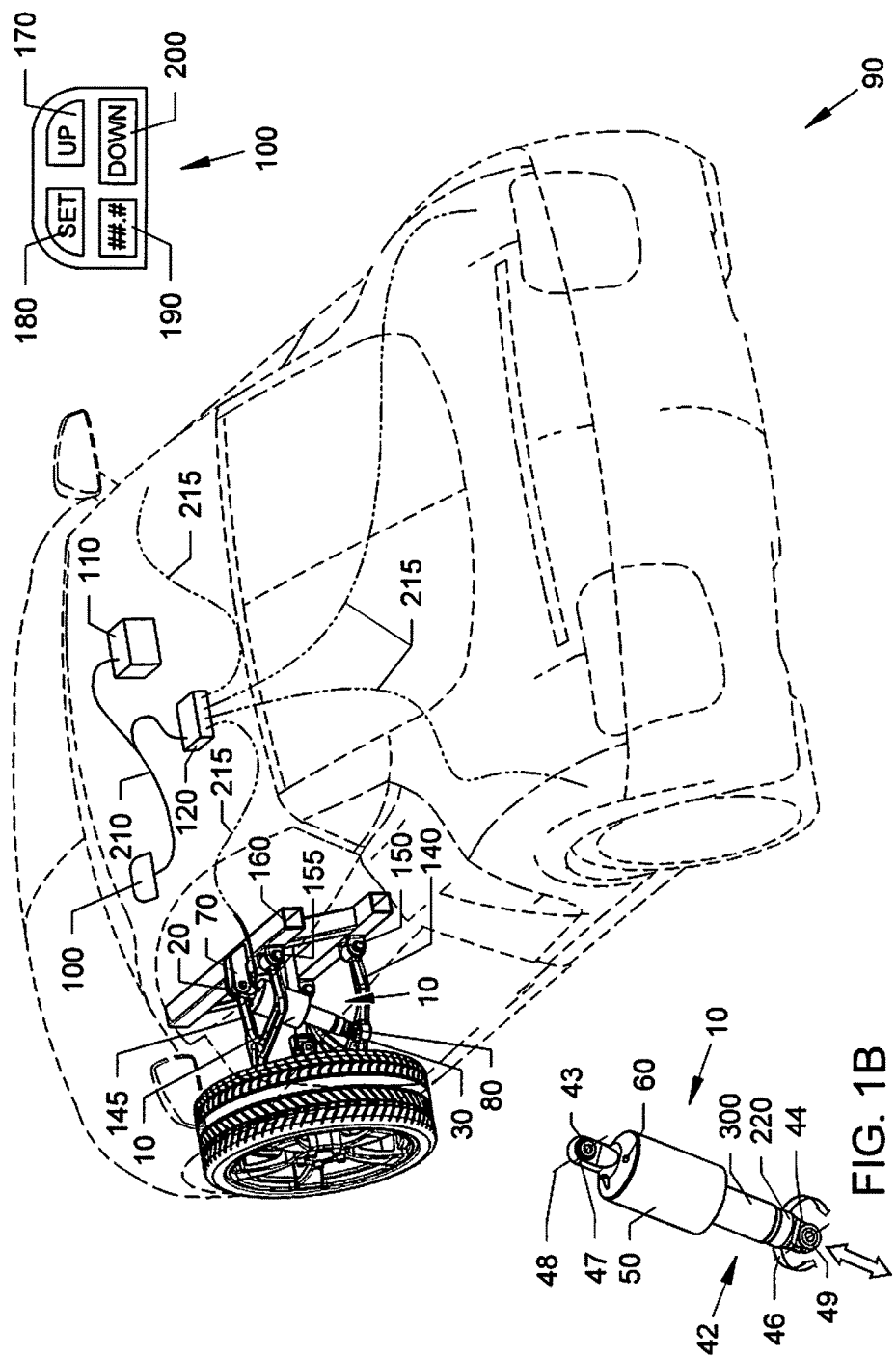
FIG. 1 is a perspective view of motor vehicle with adjustable air shock device with rotating damper assembly.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

This application is a Continuation In Part of U.S. patent application Ser. No. 15/007,785 filed Jan. 27, 2016, which is a Continuation In Part of U.S. patent application Ser. No. 14/988,342 filed Jan. 5, 2016, which is a Continuation In Part of U.S. patent application Ser. No. 14/966,678 filed Dec. 11, 2015. The entire disclosure of each of the applications listed in this paragraph are incorporated herein by specific reference thereto.

A list of the components will now be described.
10 Air Shock device with rotating damper assembly.
15 Air Shock assembly without rotating damper. (Prior Art)
17 Air Shock axis.
20 Fixed end mounting ring. Non-rotating damper Air Shock.
25 Radial bearing axis of the fixed end mounting ring.
30 Reciprocating end mounting ring.
35 Radial bearing axis of the reciprocating end mounting ring.
40 Reciprocating damper assembly.
41 Radial grooves cut into damper cylinder to provide grip points to the air bag when it is attached.
42 Reciprocating & rotating damper assembly.
43 Hemispherical bearing assembly (Prior Art).
44 Reciprocating & rotating end mount ring.
46 Radial bearing axis of the reciprocating & rotating end mount ring.
47 Fixed end mounting ring.
48 Fixed end mounting ring axis.
49 Axial bearing assembly. (Prior Art)
50 Air bag can.
60 Compressed air inlet.
70 Fixed end attachment bracket on motor vehicle.
75 Fixed end attachment bracket on motor vehicle.
80 Reciprocating end attachment bracket on lower suspension arm of motor vehicle. (Prior Art)
90 Motor vehicle.
100 Air suspension control mounted in view of vehicle operator.
110 Battery. (Prior Art)
120 Air Compressor. (Prior Art)
130 Wheel/tire assembly. (Prior Art)
140 Pivoting lower suspension arm. (Prior Art)
145 Pivoting upper suspension arm. (Prior Art)
150 Pivot axis for lower suspension arm. (Prior Art)
155 Pivot axis for upper suspension arm. (Prior Art)
160 Motor vehicle frame. (Prior Art)
170 Control button adds compressed air to the shock assembly and firms up the vehicles ride.
180 Set button can lock the compressed air valve after the desired pressure is attained.
190 Air gauge shows air pressure in shock assembly.
200 Control button bleeds compressed air from shock assembly and softens the vehicles ride.
210 Control lines from air suspension control.
215 Compressed air lines to shock.
220 Purchased damper assembly, unmodified.
222 Damper piston shaft.
223 Damper piston.
224 Damper cylinder.
227 Upper shoulder of top shock part.
228 Piston shaft collar.
229 Piston shaft cavity in top of shock.
230 Air bag.
240 Upper crimp ring.
250 Lower crimp ring for modified damper.
260 Lower crimp ring for rotating damper sleeve.
270 Top of shock assembly.
280 External thread on top of shock.
285 Internal cylinder portion with grip edges
290 Internal thread on air bag can.
300 Rotating damper sleeve.
302 Reference mark on rotating damper sleeve is used to show
301 tapering second end the damper sleeve is staying stationary as the damper assembly rotates.
303 Reference mark on damper assembly is used to show that the damper sleeve is staying stationary as the damper assembly rotates.
304 raised rim 306 stepped portion
308 narrow diameter top end
310 O-ring seals.
320 Set screw threads into top of shock and secures rod end of damper assemblies.
322 Groove in purchased damper assembly for retaining ring.
324 Retaining ring.
330 Motorcycle assembly. (Prior Art)
340 Motorcycle handlebar. (Prior Art)
350 Motorcycle rear wheel/tire assembly. (Prior Art)
352 Fixed end attachment point on motorcycle. (Prior Art)
354 Reciprocating end attachment point on motorcycle rear wheel mount frame.
360 Pivoting rear wheel frame.
362 Pivot axis for rear wheel frame.
370 Motorcycle frame.

FIG. 1 is a perspective view of motor vehicle 90 with adjustable air shock device 10 with rotating damper assembly 42. In this installation, the mounting axis of the shock mounting brackets 70, 80 can be parallel to each other. As such, the radial position of the damper inside the air shock device 10 can be oriented such that its mounting ring axis 46 are not restricted to being parallel to the mounting ring axis 48 of the top of the air shock device 10.

One claim of this patent application is that that the new air shock with rotating damper sleeve is not restricted to this parallel orientation as previous air shock designs are. This freedom of orientation will be illustrated in subsequent figures (FIGS. 15-22).

FIG. 1A is an enlarged view of the control panel 100 shown in FIG. 1. FIG. 1B is a perspective view of the adjustable air shock device 10 with rotating damper assembly 42 shown in FIG. 1.

Figure 2:
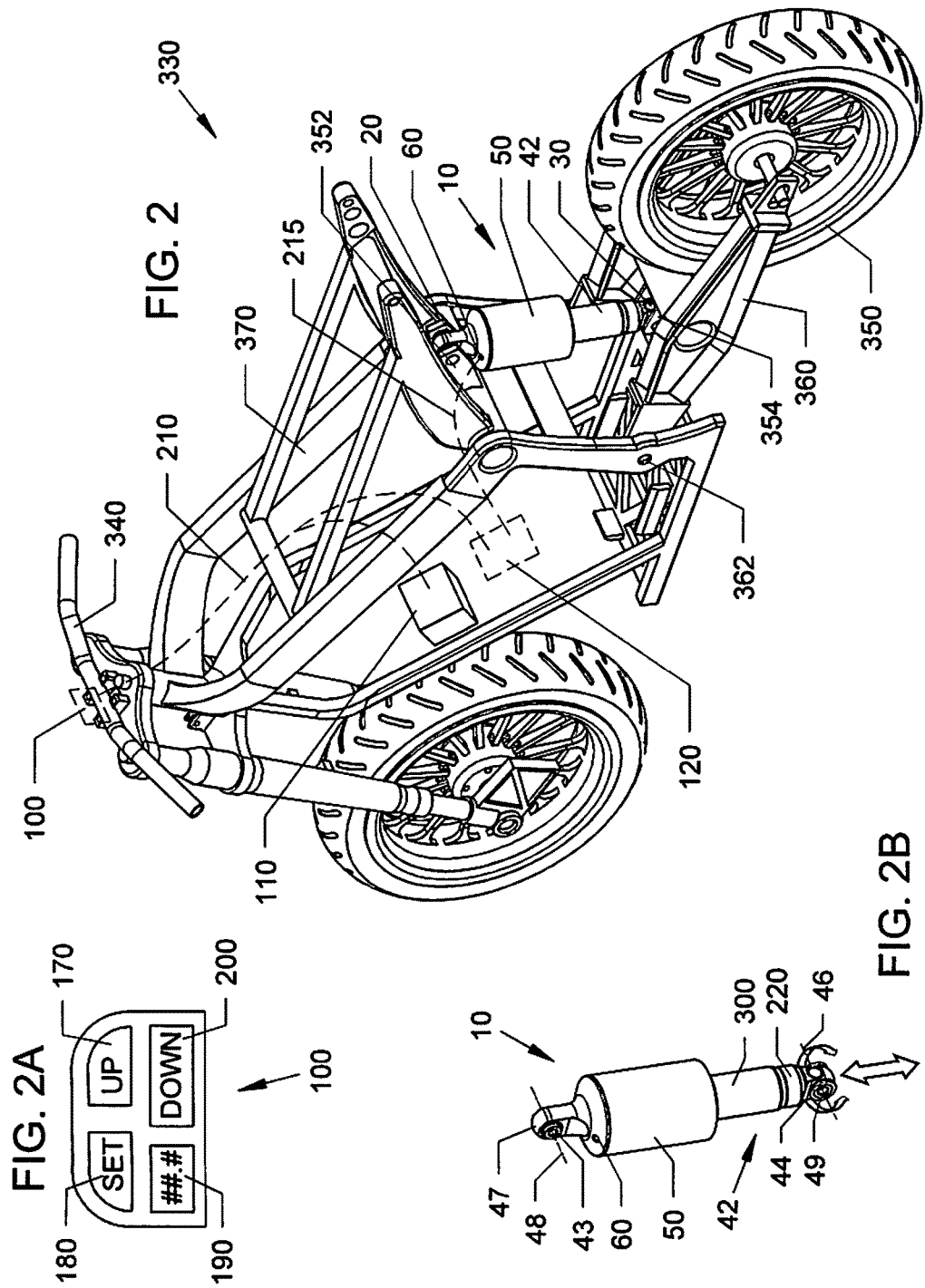
FIG. 2 is a perspective view of a two wheeled motorcycle type vehicle installed with the adjustable air shock device with rotating damper assembly of FIG. 1B.

FIG. 2 is a perspective view of a two wheeled motorcycle type vehicle 330 installed with the adjustable air shock device 10 with rotating damper assembly 42 of FIG. 1B. FIG. 2A is an enlarged view of the control panel 100 shown in FIG. 2. FIG. 2B is a perspective view of the adjustable air shock device 10 with rotating damper assembly 42 shown in FIG. 2. Referring to FIG. 2, the air shock device 10 with rotating damper assembly 42 can be installed in a two wheeled vehicle 330. As in FIG. 1, this can be a typical installation with the mounting axis 46,48 of the air shock device 10 with rotatable damper assembly 42 oriented such that they are parallel to each other.

Figure 3:
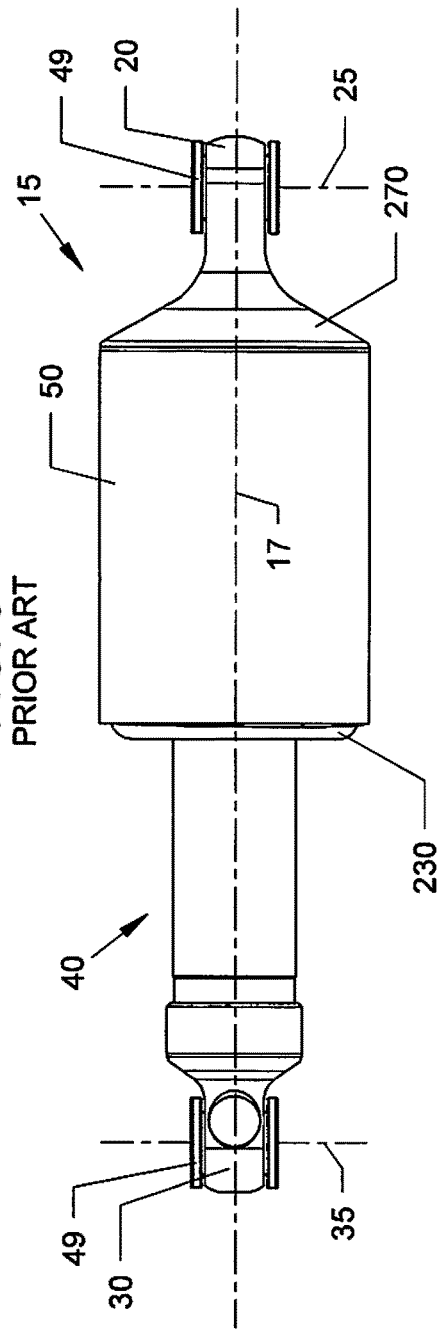
FIG. 3 is a front side view of a prior art air shock without the rotating damper assembly which is only restricted to axial reciprocal movement.
Figure 4:
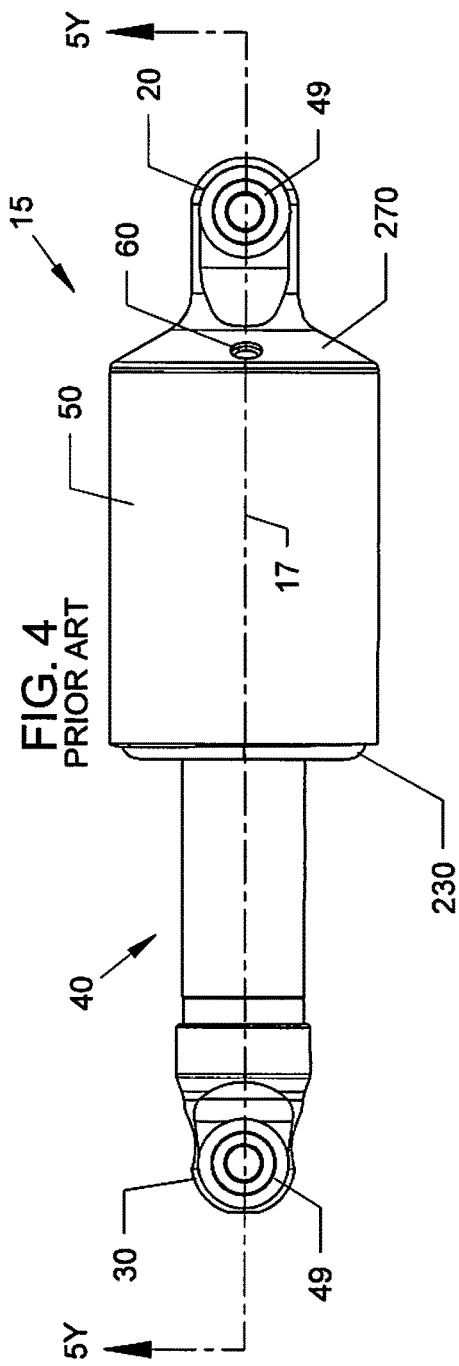
FIG. 4 is a top side view of the prior art air shock of FIG. 3 which is restricted only to axial reciprocal movement.
Figure 5:
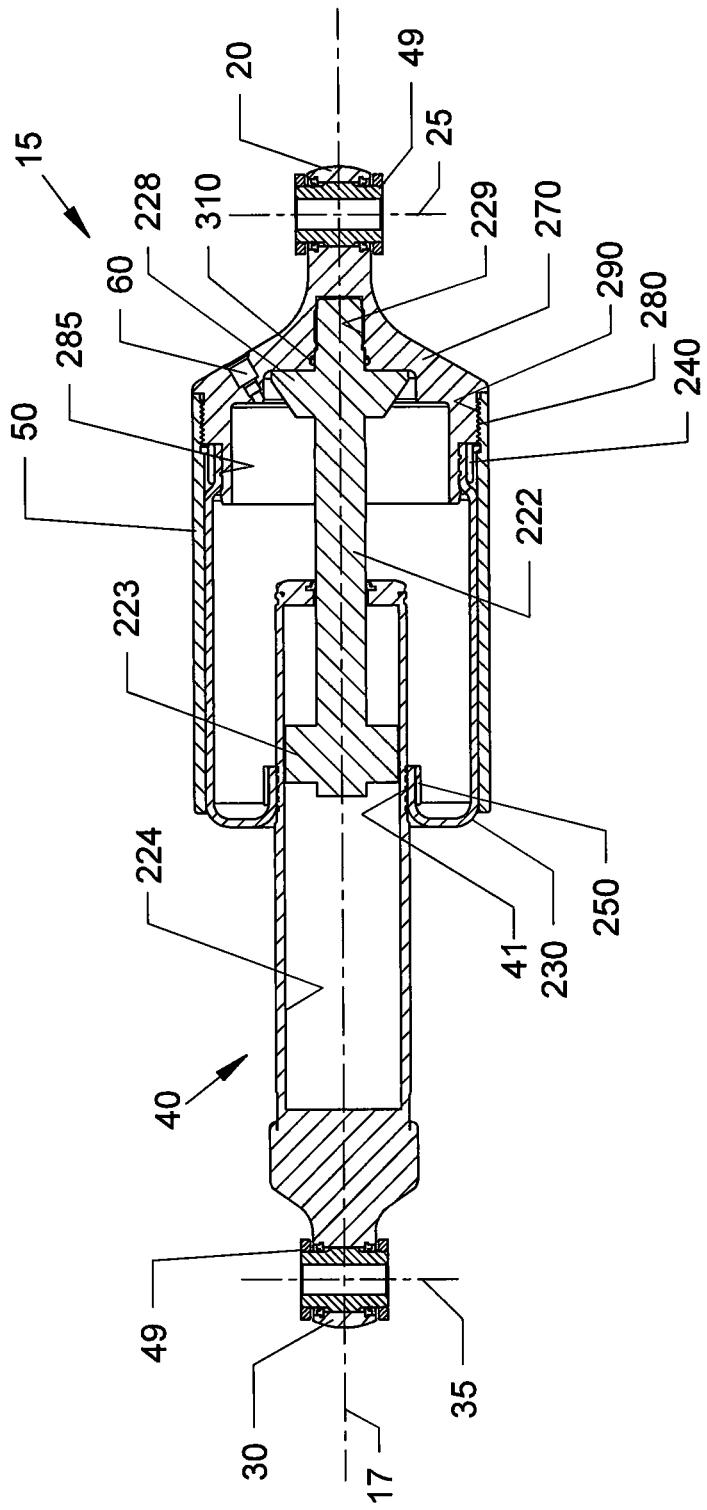
FIG. 5 is a cross-sectional view of the prior art air shock of FIG. 4 along arrows 5Y.
Figure 6:
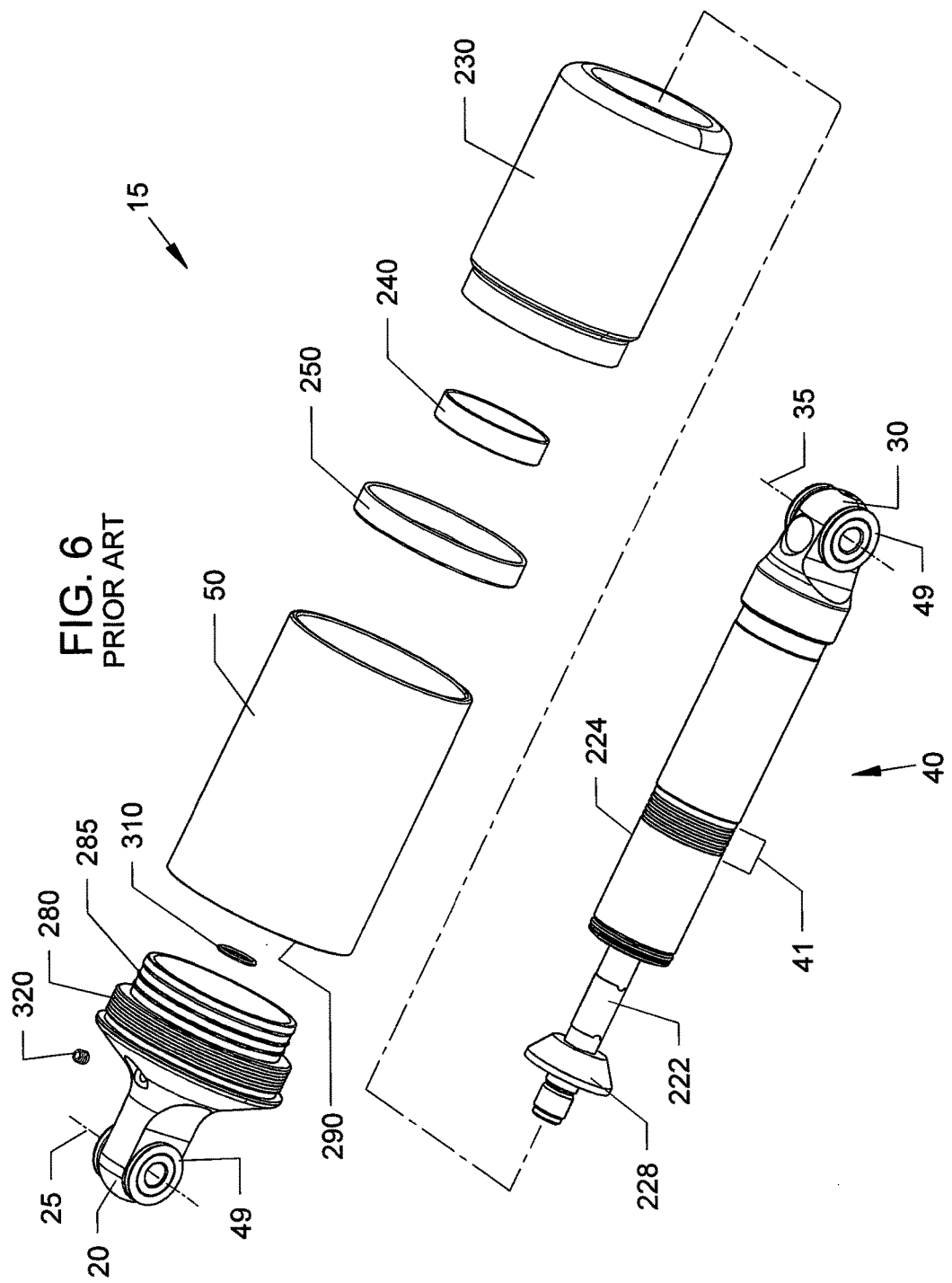
FIG. 6 is an exploded view of the prior art air shock of FIGS. 3-5.

FIG. 3 is a front side view of a prior art air shock device 15 without the rotating damper assembly 42 (shown in FIGS. 1-2B) which is only restricted to axial reciprocal movement. The reciprocating damper assembly 15 is restricted to axial movement only. FIG. 4 is a top side view of the prior art air shock 15 of FIG. 3 which is restricted only to axial reciprocal movement. FIG. 5 is a cross-sectional view of the prior art air shock 15 of FIG. 4 along arrows 5Y. FIG. 4. Shows the necessity of machining radial grooves 41 into the damper cylinder 224 in order to provide a gripping feature to the air bag 230 when it is crimped to the damper cylinder using crimp ring 250. FIG. 6 is an exploded view of the prior art air shock 15 of FIGS. 3-5. Here, the machined radial grooves 41 can be clearly seen on the damper cylinder 224.

FIG. 7 is a perspective view of a prior art damper assembly 220 having no radial grooves.

FIG. 8 is another perspective view of the prior art air damper assembly 40 with radial grooves 41 in place for use with an airbag 230.

Figure 10:
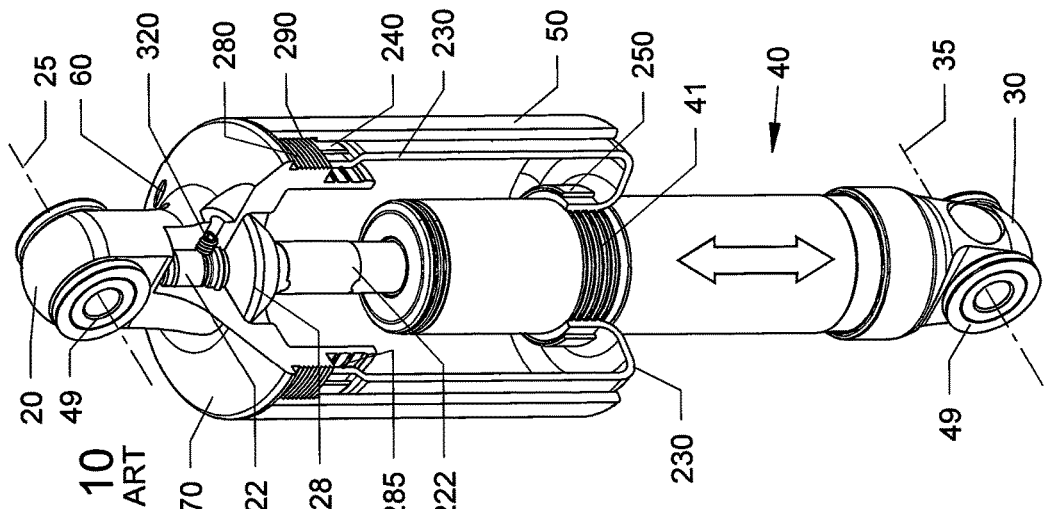
FIG. 10 is a partial breakaway view of the prior art air shock with air damper assembly of FIG. 3.
Figure 9:
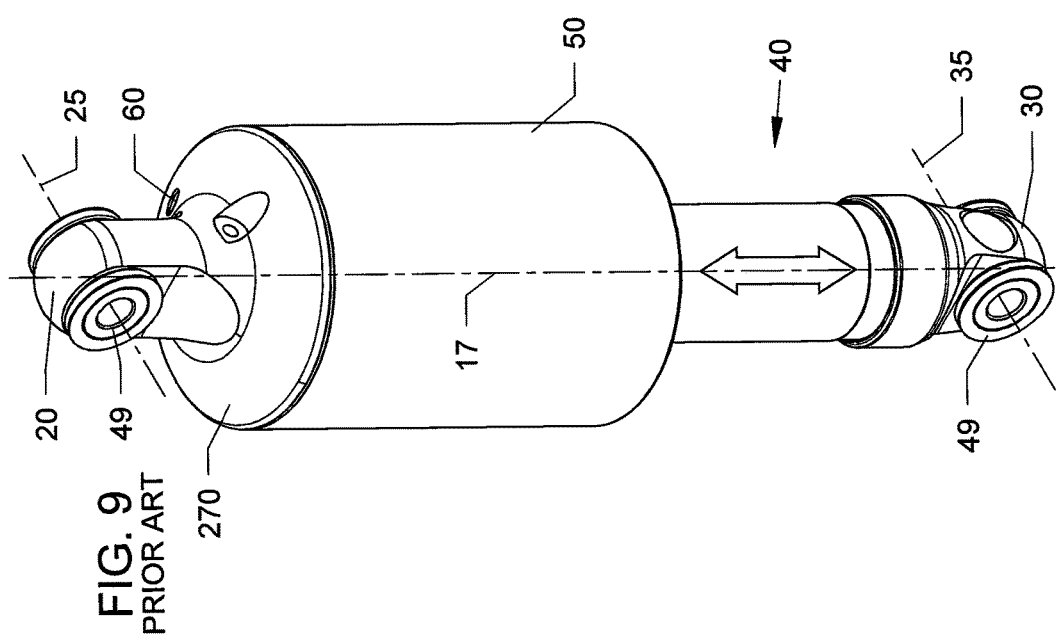
FIG. 9 is a perspective view of the prior art air damper assembly of FIG. 8 with an air shock.

FIG. 9 is a perspective view of the prior art air damper assembly 40 of FIG. 8 with an air shock 15. FIG. 10 is a partial breakaway view of the prior art air shock 15 with air damper assembly 40 of FIG. 3.

Referring to FIGS. 3-10, the prior art air shock 15 with damper assembly 40 can include a reciprocating end mounting ring 30 with a radial bearing axis 35 which generally remains parallel to a radial bearing axis 25 of the fixed end mounting ring 20 on the air shock device 15. The parallel axes 25, 35 can mount to known axial bearing assemblies 49.

The damper assembly with the reciprocating piston shaft can function as a hydraulic shock absorber, such as, but not limited to the hydraulic shock absorber shown and described in U.S. Pat. No. 2,856,035 to Rohacs, which is incorporated by reference.

Air shock assembly 15 can include an air bag can 50 with an upper end with internal threads 290 threadably attached to external threads 280 on a male portion extending from the fixed end mounting ring 20 of the air shock assembly 15. A set screw 320 can thread into the top 270 of the shock assembly 15 and secures the piston shaft collar 228 of the rod/shaft 222 in place. The upper end of the rod 222 fits into the piston shaft cavity 229 with O-ring seals 310 forming a fluid seal. A damper piston 223 is formed in the lower end of the piston rod 222.

A crimp ring 240 can lock an upper end of the air bag 230 onto a grooved surface of an internal cylinder portion 285 of the air shock assembly 15. A lower end of the air bag 230 can be locked in place by a crimping ring 250 that presses against radial grooves 42 that can be cut into the damper cylinder 224 to provide grip points to the air bag 230.

Referring to FIGS. 3-10, compressed air inlet 60 allows for compressed air to pass into the inside of air can 50. The damper assembly 40 is limited to reciprocal movement along one axis 17, and requires the mounting axes 25, 35 to always be parallel to one another. In the prior art, the damper assembly 40 cannot rotate nor twist relative to the air shock assembly 15 since the diaphragm bag 230 is crimped in place by crimping rings 240, 250, FIG. 11 is front side view of the novel adjustable air shock 10 with rotatable damper assembly 42 shown in FIGS. 1B and 2B. FIG. 12 is a top side view of the adjustable air shock 10 and rotatatable damper assembly 42 of FIG. 11

FIG. 13 is a cross-sectional view of the adjustable air shock 10 and rotatable damper assembly 42 of FIG. 12 along arrows 13Y. FIG. 13A is an enlarged view of the air bag 230 crimped by crimper ring 260 to the damper sleeve 300 adjacent to raised rim 304 shown in FIG. 13. As shown in FIG. 13, opposite end of air bag 230 can be crimped in place by crimping ring 240 crimped about internal cylinder 285. FIG. 13B is an enlarged view of the top of the damper assembly 40 with groove 322 in the upper end of the piston sleeve to support a retaining ring 324. The retaining ring 324 holds the upper end of the damper assembly about the piston 222. FIG. 13C is an enlarged view of the bottom of the damper assembly 42 with gaps 305 between the sleeve 300 and lower tapering end 301 of damper 220, which allows rotational movement between the damper assembly 42 and the shock assembly 10. The gap 305 allows the freedom of rotational movement between the damper assembly 42 and the shock assembly 10.

Figure 14:
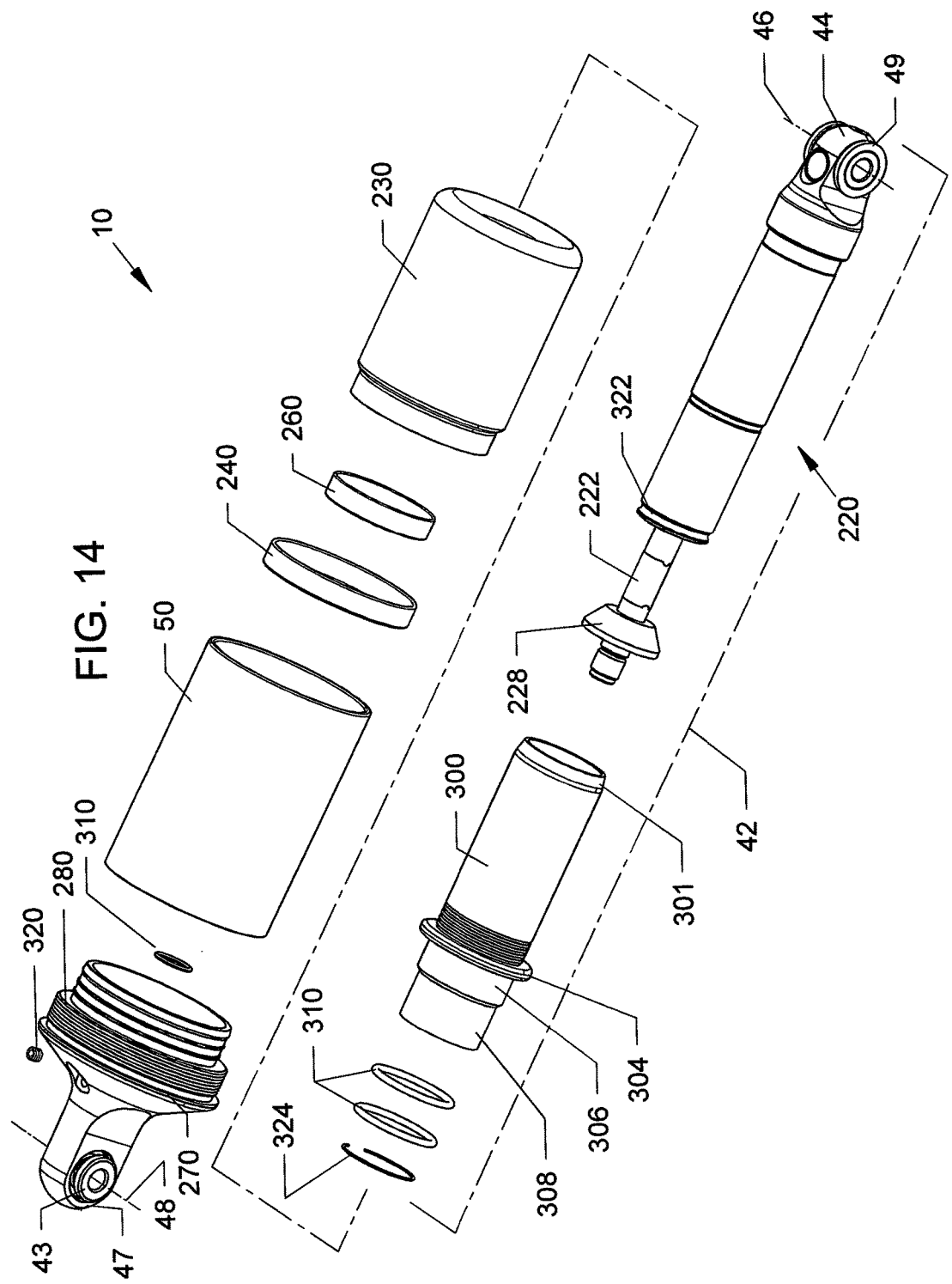
FIG. 14 is an exploded view of the adjustable air shock and rotatable damper assembly within the damper sleeve of FIGS. 11-13C.

FIG. 14 is an exploded view of the novel shock assembly 10 with rotatable damper assembly 42, which shows additional detail of the sleeve 300, such as the raised rim 304, upper portion 306 which steps down to narrower sleeve cylinder portion 308, along with O-rings 310 and retaining ring 324 and other parts of the novel invention.

FIGS. 13, 13A and 14 show the air bag 230 crimped to the new rotating damper sleeve 300 eliminating the necessity of machining radial grooves 41 onto the prior art damper assembly 220.

Referring to FIGS. 11-14, the air shock device 10 with reciprocating and rotating damper assembly 42 can have a reciprocating and rotating end ring 44 with a radial bearing axis 46 that has a radial freedom relative to the fixed end axis 48. The fixed end axis 48 can run through the fixed end mounting ring 47. The axis 48 of this upper hemispherical bearing assembly can rotate several degrees out of perpendicular to the axis 17 of the air shock assembly 10. This increased freedom of movement is not available in a standard axial bearing 49 but is necessary when the reciprocating end mount ring 46 has the freedom to rotate around the axis of the air shock 10 independent of the fixed end mount ring 47. Those two axis 46, 48 can be out of parallel orientations to one another due to the ability of the damper assembly 42 to rotate about air shock axis 17.

FIG. 15 is a perspective view of the adjustable air shock 10 with rotatable damper assembly 42 of FIGS. 11-14. The rotating end mount ring axis 46 is shown parallel to the fixed end mount ring axis 46. FIG. 16 is partial breakaway view of the adjustable air shock 10 and rotatable damper assembly 42 of FIG. 15 with damper assembly 42 rotating relative to the sleeve 300.

Referring to FIGS. 15-16, motion arrows indicate the ability of the damper assembly 42 to articulate axially and radially. The rotating end mount ring axis 46 is shown rotated approximately 45 degrees out of parallel to the fixed end mount ring axis 48.

FIG. 17 is another perspective view of the adjustable air shock 10 with rotatable damper assembly 42 of FIG. 15. FIG. 18 is another perspective view of FIG. 17 with adjustable air shock 10 with rotatable damper 42 starting to rotate counter-clockwise. FIG. 19 is another perspective view of FIG. 17 with adjustable air shock 10 with rotatable damper 42 starting to rotated approximately 90 degrees counter-clockwise. FIG. 20 is another perspective view of FIG. 17 with adjustable air shock 10 with rotatable damper 42 starting to rotated approximately 180 degrees counter clockwise.

FIGS. 17-20 are similar with the exception of the orientation of the rotating end mount ring axis 46 relative to the fixed end mount ring axis 48. The rotating end mount ring axis 46 is shown rotating in 45 degree increments as the figures progress. A radial motion arrow stresses this feature of the new invention.

The reference mark 302 on the damper sleeve 300 is used to show the damper sleeve 300 remains stationary as the damper assembly 42 rotates. The reference mark 303 on damper assembly 220 is used to show that the damper sleeve 300 is staying stationary as the damper assembly 42 rotates.

FIG. 21 is a perspective view of the novel adjustable air shock 10 with rotatable damper assembly 42 installed into a motor vehicle 90 (shown in FIGS. 1, 1A, 1B) with the orientation of the both shock mount brackets axes 70, 80 being parallel to one another. This installation will accept the invention 10, 42 as well as the prior art version 15, which does not allow for a rotating damper assembly 42. FIG. 21A is a perspective view of the air shock assembly 10 with rotatable damper assembly 42.

Referring to FIGS. 1, 1A, 1B, 21 and 21A, motor vehicle frame 160 can support fixed end attachment bracket 70 which allows for mounting ring 47 thereto. Wheel 130 can be held in place by pivoting upper suspension arm 145 with pivot axis 155, and pivoting lower suspension arm 140 with pivot axis 150.

FIG. 22 is a perspective view of another installation of the novel adjustable air shock 10 with rotatable damper assembly 42 where the orientation of the shock mount brackets 75, 80 are approximately 45 degrees out of parallel to one another. FIG. 22A is a perspective view of the air shock assembly 10 with rotatable damper assembly 42 of FIG. 22. This installation will not accept the prior art shock assembly 15 with damper assembly 40 because the prior art version does not offer the freedom to rotate the reciprocating end mount ring axis out of parallel to the fixed end mount ring axis. The detail shown in FIG. 22A shows the shock 10 with rotatable damper assembly 42 out of the context of the suspension assembly but with the proper mounting axis orientation.

Referring to FIGS. 2, 2B, the novel shock assembly 10 with rotatable damper assembly 42 can be installed in over a rear wheel/tire assembly 350 on a motorcycle 330, by being installed between a fixed end attachment point 352 and a reciprocating end attachment point 354 on a motorcycle rear wheel mount frame 360. that is attached to a motorcycle frame 370 by a pivot axis 362.

Referring to FIGS. 1, 1A, 1B, 21, 21A, 22 and 22A, a control panel 100 can be mounted within reach of a driver inside of the motor vehicle 90, with a battery 110 powering an air compressor 120.

Air lines 215 can be attached between the air compressor 120 and the air inlet 60 on each shock device 10, and allows air to be injected into the air inlet 60 into the interior chamber inside each air bag 230 inside of each air bag can 50 in the shock devices located adjacent to each wheel/tire assembly 130

On the panel 100, switches 170, 200 can be push button switches which either add compressed air simultaneously to each air shock assembly 10 by depressing button 170, or remove air simultaneously from each air shock assembly 10 by pressing on button 200.

Control button 170 adds compressed air to each air bag 230 in each shock device 10 and can lift the motor vehicle 90 relative to a road surface. Control button 200 when pressed can bleed compressed air from air bag 230 in shock device 10 which results in dropping the motor vehicle 90 to a road surface.

Set button 180 can lock the compressed air valve in each air shock 10 after the selected pressure in the air bag 230 is reached.

Air gauge 190 displays air pressure in PSI inside the shock devices 10.

The depressible buttons 170, 200 allow for instant inflation and deflation of the airbag (air bladder) 230 within the air shock assembly 10, and allow the driver to achieve desired operating conditions of the air shock assembly 10 in seconds.

The air shock assembly 10 can operate similar to the combined air suspension device 1, shown and described in U.S. Pat. No. 8,113,322 to Arnott, which is incorporated by reference in its' entirety.

Here, an operating gauge 190 can show in real-time the pressure of compressed air in air shock assembly 10, which can run from approximately 0 PSI (pounds per square inch) for minimum pressure level to as much as approximately 250 PSI for maximum pressure loads. A set button 180 can be preset to different pressure levels so that the operator can immediately depress to various pre-programmed pressure states for settings such as but not limited to states that are smooth and comfortable, firm and rigid, or somewhere in the middle. The driver can further make adjustments to the air suspension devices 1 based on their height, weight, and any other customized conditions as desired.

Referring to FIGS. 1, 1A, 1B, 21, 21A, 22 and 22A, as compressed air is released outward from air inlet 60, each airbag 230 retracts(deflates) within airbag can 50, while compressing spring 250 to a compressed state. While in an uncompressed air state with each airbag (bladder) deflated, the more air removed, the smoother the ride is for the driver and passenger(s). The greater amount of shock cushion effect results in a smoother ride.

The motorcycle installation shown in FIGS. 2, 2A and 2B, can operate with similar controls 100 mounted on motorcycle handlebar 340, with components 110, 120, 210 and the like.

Although the embodiments show the invention being used on a motor vehicle, such as an automobile, the invention can be used on other motor vehicles, such as but not limited to vans, trucks, four wheel drive vehicles, off the road vehicles, All-terrain vehicles, dune buggies, golf carts, and the like.

While the embodiments show the controls being used on all four wheels to raise and lower the motor vehicle, the controls can be used separately on just the rear wheels, and/or separately on just the front wheels, and other combinations thereof.

Although the embodiments show motor vehicles having four wheels, the invention can be used with motor vehicles having three wheels or five or more wheels.

While the figures show the novel combination of air shock assembly 10 and rotatable damper assembly mounted in one arrangement, the air shock assembly 10 and damper assembly can be oppositely mounted to the motor vehicle Although the preferred embodiment shows the air shock device 10 mounted in a vertical orientation, the novel air shock device 10 can be mounted horizontally on motor vehicles where the existing shocks/springs are mounted.

Although the invention describes use of the air shock device with air, the invention can be used with other fluids, such as but not limited to other types of gases, liquids, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An adjustable air shock with rotatable damper assembly, comprising:
    an air shock having a housing with a closed end and a opposite facing open end, the closed end having a first mounting bracket with a first axis opening along one direction;
    a fluid damper housing having a first end supported inside of the air shock housing adjacent to the closed end, and a second end protruding from the open end of the air shock housing so that the first end and second end of the fluid damper housing moves from a retracted position to an extended position relative to the air shock housing, the second end of the fluid damper housing having a second mounting bracket with a second axis opening along a second direction;
    an elongated hollow sleeve having a first end supported inside the air shock housing adjacent to the first end of the fluid damper housing, and a second end protruding from the open end of the air shock housing adjacent to the second end of the fluid damper, wherein the fluid damper housing is rotatably mounted inside of the elongated hollow sleeve, so that the damper housing has freedom to rotate relative to sleeve and air shock housing; and
    a rolling diaphragm having a first end attached inside the air shock housing adjacent to the closed end, and a second end attached to an outer side of the elongated hollow sleeve, wherein the damper housing is adapted to be able to rotate within the elongated hollow sleeve so that the adjustable air shock with rotatable damper assembly is adapted to mount to supports where the first axis opening of the first mounting bracket in a different direction from the second axis opening of the second mounting bracket.

2. The adjustable air shock with rotatable damper assembly of claim 1, wherein the rolling diaphragm includes an air bag.

3. The adjustable air shock with rotatable damper assembly of claim 1, wherein the fluid damper includes a hydraulic fluid damper with reciprocating piston.

4. The adjustable air shock with rotatable damper assembly of claim 1, wherein the second end of the diaphragm attached to the outer side of the elongated hollow sleeve includes: a crimp ring for attaching the second end of the diaphragm to the outer side of the elongated hollow sleeve.

5. The adjustable air shock with rotatable damper assembly of claim 4, wherein the first end of the elongated hollow sleeve includes: a raised rim adjacent to the end of the diaphragm that is attached to the outer side of the elongated hollow sleeve.

6. The adjustable air shock with rotatable damper assembly of claim 1, further comprising:
    grooves formed between the hollow sleeve and an outer side portion of the fluid damper.

7. The adjustable air shock with rotatable damper assembly of claim 6, further comprising: O-rings for allowing a fluid seal while the damper housing is rotatable relative to the sleeve.

8. The adjustable air shock with rotatable damper assembly of claim 1, wherein the second end of the hollow sleeve includes:
    a tapered end adjacent to a step portion on the second end of the damper housing.

9. The adjustable air shock with rotatable damper assembly of claim 1, further comprising:
    a radial space about the damper housing separating a substantial surface portion of the damper housing from the elongated hollow sleeve.

10. The adjustable air shock with rotatable damper assembly of claim 9, further comprising: grooves formed between the hollow sleeve and an outer side portion of the fluid damper.

11. The adjustable air shock with rotatable damper assembly of claim 10, further comprising: O-rings for allowing a fluid seal while the damper housing is rotatable relative to the sleeve.

12. The adjustable air shock with rotatable damper assembly claim 1, further including:
    a compressed air source attached to the closed end of the air shock; and
    a control for adjusting compressed fluid levels between the compressed air source and the air shock housing, wherein increasing and inflating compressed fluid levels inside the air shock housing causes rolling diaphragm to retract in and extend out of the air shock housing to increase and decrease.

13. The adjustable air shock with rotatable damper assembly of claim 12, wherein the wherein the control includes:
    an increase switch for adding compressed air into the rolling diaphragm; and
    a decrease switch for releasing compressed air from the rolling diaphragm.

14. An adjustable air shock with rotatable damper assembly system for motor vehicles, comprising:
    a plurality of air shock and damper assemblies for mounting to rear wheel mount supports in a motor vehicle, each air shock and damper assembly including an air shock having a housing with a closed end and a opposite facing open end, the closed end having a first mounting bracket with a first axis opening along one direction;
    a fluid damper housing having a first end supported inside of the air shock housing adjacent to the closed end, and a second end protruding from the open end of the air shock housing so that the first end and second end of the fluid damper housing moves from a retracted position to an extended position relative to the air shock housing, the second end of the fluid damper housing having a second mounting bracket with a second axis opening along a second direction;
    an elongated hollow sleeve having a first end supported inside the air shock housing adjacent to the first end of the fluid damper housing, and a second end protruding from the open end of the air shock housing adjacent to the second end of the fluid damper, wherein the fluid damper housing is rotatably mounted inside of the elongated hollow sleeve, so that the damper housing has freedom to rotate relative to sleeve and air shock housing; and
    a rolling diaphragm having a first end attached inside the air shock housing adjacent to the closed end, and a second end attached to an outer side of the elongated hollow sleeve, wherein the damper housing is adapted to be able to rotate within the elongated hollow sleeve so that the adjustable air shock with rotatable damper assembly is adapted to mount to supports where the first axis opening of the first mounting bracket in a different direction from the second axis opening of the second mounting bracket.

15. The adjustable air shock with damper assembly system of claim 14, wherein the motor vehicle is an automobile.

16. The adjustable air shock with damper assembly system of claim 14, wherein the motor vehicle is a motorcycle.

17. The adjustable air shock with damper assembly system of claim 14, wherein the second end of the diaphragm attached to the outer side of the elongated hollow sleeve includes: a crimp ring for attaching the second end of the diaphragm to the outer side of the elongated hollow sleeve.

18. The adjustable air shock with damper assembly system of claim 14, wherein the first end of the elongated hollow sleeve includes: a raised rim adjacent to the end of the diaphragm that is attached to the outer side of the elongated hollow sleeve.

19. The adjustable air shock with damper assembly system of claim 14, further comprising:
    grooves formed between the hollow sleeve and an outer side portion of the fluid damper.

20. The adjustable air shock with damper assembly system of claim 14,
further comprising: O-rings for allowing a fluid seal while the damper housing is rotatable relative to the sleeve.

* * * * *